United States Patent Office 3,341,458
Patented Sept. 12, 1967

3,341,458
N-SUBSTITUTED AMIDES OF HYDROXYETHOXY-ACETIC ACID AND PROCESSES FOR USING SAME
Raymond L. Mayhew, Summit, N.J., and Earl P. Williams, Pen Argyl, Pa., assignors to General Aniline & Film Corporation, New York, N.Y., a corporation of Delaware
No Drawing. Filed Sept. 27, 1966, Ser. No. 582,243
5 Claims. (Cl. 252—117)

ABSTRACT OF THE DISCLOSURE

A lime soap dispersant and a method of dispersing lime soap wherein the dispersing compound is selected from the group consisting of:

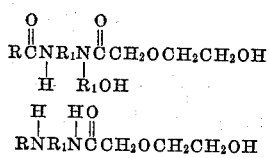

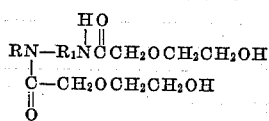

and

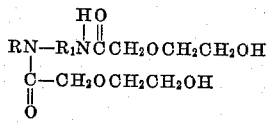

wherein R is a hydrocarbon radical containing from about 8 to about 21 carbon atoms; and $R_1$ is a lower alkylene radical.

---

This application is a continuation-in-part of application Ser. No. 142,512 filed Oct. 3, 1961, now abandoned.

The present invention relates to novel amides useful as surface active agents and more particularly to novel N-substituted amides of hydroxyethoxyacetic acid and processes for dispersing lime soap therewith.

A primary function of synthetic detergents or surface active agents is to act as a dispersant for the lime soaps present in water. While various synthetic detergents, i.e., sulfonates, polyphosphates, etc., are effective in dispersing or suspending minerals and other forms of dirt, such detergents do not possess the necessary ability to soften water and to suspend and deflocculate insoluble lime soaps present therein.

In accordance with the present invention, novel synthetic detergents have been prepared which, in addition to being effective in dispersing minerals and other forms of dirt, are effective in dispersing or suspending the lime soaps present in water.

It is therefore a principal object of the present invention to provide novel synthetic detergents.

It is a further object of the present invention to provide as detergents or surface active agents suitable for dispersing lime soaps, etc., novel N-substituted amides of hydroxyethoxyacetic acid.

Still further objects and advantages of the product and process of the present invention will become more apparent from the following more detailed description of the invention.

The novel N-substituted amides of the present invention can be represented by the following general formulae:

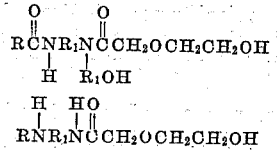

and $$RN-R_1N\overset{HO}{\overset{|}{\underset{\underset{O}{\|}}{C}}}CH_2OCH_2CH_2OH$$
$$\underset{\underset{O}{\|}}{\overset{|}{C}}-CH_2OCH_2CH_2OH$$
III wherein R is a hydrocarbon radical containing from about 8 to about 21 carbon atoms; and $R_1$ is a lower alkylene radical containing from 2-6 carbon atoms.

When substantially equimolar amounts of amine and 2-paradioxanone are employed, products corresponding to Formulae I or II are produced whereas the diamides of Formula III are produced when the diamine to p-dioxanone molar ratio is approximately 2:1. Of course, mixtures of these materials can be produced by the employment of intermediate molar ratios of amine to p-dioxanone.

Compounds of the foregoing structures are conveniently prepared by reacting a suitable substituted alkanolamine or alkylene diamine with 2-paradioxanone at temperatures of 75° C. to 175° C. The latter compound has the structure:

and is easily prepared from diethylene glycol according to known procedures.

Suitable amines for producing the amides of this invention include, for example,
undecylamidoethyl ethanolamine,
tridecylamidoethyl ethanolamine,
pentadecylamidoethyl ethanolamine,
nonylamidoethyl ethanolamine,
octylamidopropyl ethanolamine,
pentadecylamidoethyl propanolamine,
oleylamidoethyl propanolamine,
heptadecenylamidoethyl ethanolamine,
oleylamidoethyl ethanolamine,
N-coconut fatty alkyl-propylene diamine,
N-soya fatty alkyl-propylene diamine,
N-tallow fatty alkyl-propylene diamine,
N-coconut fatty alkyl ethylene diamine,
N-soya fatty alkyl ethylene diamine,
N-tallow fatty alkyl ethylene diamine, and the like.

The novel N-substitued amides of hydroxyethoxyacetic acid of the present invention are particularly suitable as lime soap dispersing agents in aqueous compositions. Only a minor amount of such material need be employed in order to effectively disperse or flocculate all of the lime soaps that are present. In general, an amount of from 1% to about 40% by weight based on the amount of lime soaps to be dispersed is effective in dispersing all of such material. This is extremely effective in that conventional lime soap dispersing agents generally require 60% or more of the dispersing agent based on the weight of the lime soaps to be dispersed to disperse such lime soap material.

The materials of the present invention are generally employed as lime soap dispersing agents in hard water containing alkali metal fatty acid soaps as illustrated by specific examples which follow.

The following specific examples illustrate various embodiments of the present invention. It is to be understood that such examples are for purposes of illustration only and are in no way to be deemed as limiting the invention disclosed and claimed.

EXAMPLE 1

Into a 500 ml. round-bottom flask equipped with a thermometer, stirrer, condenser and dropping funnel, were placed 86.4 grams (0.4 mol) of nonylamidoethyl ethanolamine. The amine was heated to 140° C. and 40.8 grams (0.4 mol) 2-p-dioxanone ($n_D^{25}$ 1.4508 were added through the dropping funnel at a rection temperature of 140–145° C. over a period of 20 minutes and then the reaction was held at 140–145° C. for 5½ hours. At the end of this time titration of amine consumed showed that the raction was essentially 100% complete.

Analysis of the product showed it to be the nonylamidoethyl ethanolamide of hydroxyethoxyacetic acid of the formula:

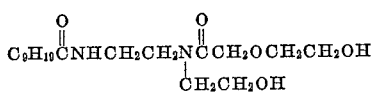

Titration of the amine consumed indicated 88% conversion.

EXAMPLE 2

In a manner similar to that described in Example 1, 111.3 grams (0.3 mol) of heptadecenylamidoethyl ethanolamine were reacted with 30.6 grams (0.3 mol) of 2-p-dioxanone, for 5 hours, at 135–140° C., to yield the compound:

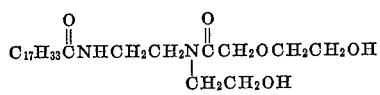

corresponding to the heptadecenylamidoethyl ethanol amide of hydroxyethoxyacetic acid.

Titration of the amine consumed showed a conversion of 84%.

EXAMPLE 3

In the manner previously described, 107.3 grams (0.33 mol) of pentadecylamidoethyl ethanolamine were reacted with 33.6 grams (0.33 mol) of 2-p-dioxanone for 6 hours at 140–145° C., to produce the pentadecylamidoethyl ethanol amide of hydroxyethoxyacetic acid having the formula:

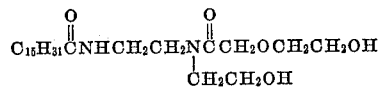

Titration of the amine consumed showed a conversion of 87%.

EXAMPLE 4

In a similar manner, 105.7 grams (0.38 mol) of undecylamidoethyl ethanolamine were reacted with 38.7 grams (0.38 mol) of 2-p-dioxanone for 5 hours, at 110–130° C., to yield the undecylamidoethyl ethanol amide of hydroxyethoxyacetic acid having the formula:

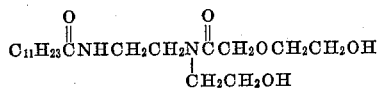

The reaction was 86% complete.

A standard Draves wetting test of 0.49 grams/liter for the 25-second concentration indicated that the product was an excellent wetting agent.

EXAMPLE 5

128.4 grams (0.4 mol) of N-coconut fatty alkylpropylene diamine were reacted with 40.8 grams (0.4 mol) of 2-p-dioxanone, for 5 hours, at 90–110° C., to produce the compound

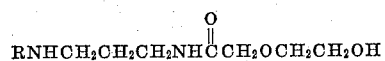

The coconut fatty radical R is derived from the coconut fatty amine moiety having the following composition:

| | Percent |
|---|---|
| Octylamine | 8 |
| Decylamine | 9 |
| Dodecylamine | 47 |
| Tetradecylamine | 18 |
| Hexylamine | 8 |
| Octadecylamine | 5 |
| Octadecenylamine | 5 |

Titration of this amine consumed showed a conversion of 100%.

This compound was both a good low-foam wetting agent and lime soap dispersing agent.

EXAMPLE 6

In accordance with the procedures followed above, 120.6 grams (0.3 mol) of N-soya fatty alkyl-propylene diamine was reacted with 30.6 grams (0.3 mol) of 2-p-dioxanone, for 5 hours, at 90–100° C., to yield the product:

The soya fatty radical R is derived from the soya fatty amine moiety having the following composition:

| | Percent |
|---|---|
| Hexadecylamine | 10 |
| Octadecylamine | 10 |
| Octadecenylamine | 35 |
| Octadecadienylamine | 45 |

Analysis of the hydroxyl content showed a conversion of 99%.

The compound was an effective lime soap dispersing agent.

The next two examples illustrate the results when other than equimolar amounts of reactants are used.

EXAMPLE 7

Following the same procedures as for the previous examples, 64.2 grams (0.2 mol) of N-coconut mixed fatty alkylpropylenediamine was reacted with 40.8 grams (0.4 mol) of 2-p-dioxanone, for a period of 5 hours, at 125–135° C., to yield the product:

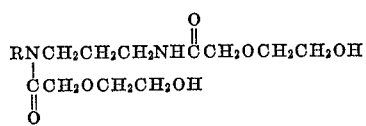

R has the same significance as in Example 5.

Titration of amine consumed showed the reaction to be 86% complete.

A standard Draves wetting test of 0.70 grams/liter for the 25-second concentration indicated excellent wetting properties.

EXAMPLE 8

Following the procedures previously outlined, 80.4 grams (0.2 mol) of N-soya mixed alkyl-propylene diamine were reacted with 40.8 grams (0.4 mol) of 2-p-dioxanone, for 5 hours at 95–140° C., to yield the product

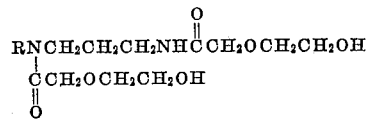

R has the same significance as in Example 6.

Titration of amine consumed showed a conversion of 87%, and analysis for hydroxyl content showed a conversion of 86%.

This product was an effective low-foaming wetting agent and a very effective lime soap dispersing agent.

EXAMPLE 9

A lime soap dispersion test was made on the product of Example 3. The procedure employed was that shown in "Synthetic Detergents in the Soap Industry," J. Am. Oil Chem. Soc., Vol. XXVII, page 90 (1950). Such test measures the ability of a dispersing agent to disperse insoluble metallic soaps using sodium oleate as the standard soap to be dispersed.

The product of Example 3 was calculated as having a 20% to 30% lime soap dispersing power, i.e., only 20% to 30% of the dispersant by weight based on the amount of soap to be dispersed need be employed to disperse all of the lime soaps present. Such test indicates the very effective lime soap dispersing effect of the products of the present invention.

Percent lime soap dispersing power=

$$\frac{\text{Grams of dispersing agent to disperse lime soap}}{0.025 \text{ (weight of Na oleate)}} \times 100$$

EXAMPLE 10

The test of Example 9 was repeated using the product of Example 4.

A lime soap dispersing power of 10% to 20% was calculated. This again indicates the very effective dispersing power of the products of the present invention.

EXAMPLE 11

The test of Example 9 was again repeated using the product of Example 5.

A lime soap dispersing power of 8%–10% was calculated again indicating that the material tested is a very effective dispersing agent for lime soaps.

EXAMPLE 12

The test of Example 9 was again repeated using the product of Example 8.

A lime soap dispersion power of 6% to 8% was calculated. Only 6% to 8% by weight of this material based on the weight of the lime soap was needed to disperse all of the lime soap present.

Again, this indicates the very effective lime soap dispersing power of this material.

While certain preferred embodiments have been illustrated by way of specific examples it is to be understood that the present invention is in no way to be deemed as limited thereto but should be construed as broadly as all or any equivalents thereof.

We claim:
1. A method of dispersing lime soaps formed in hard water with alkali metal fatty acid soaps which comprises incorporating in the water as a dispersing agent a compound selected from the group consisting of:

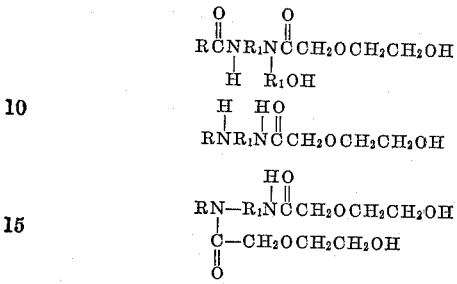

wherein R is a hydrocarbon radical containing from about 8 to about 21 carbon atoms; and $R_1$ is a lower alkylene radical, said dispersing agent being employed in an amount of from about 1% to about 40% by weight based on the amount of lime soap.

2. The method of claim 1 wherein said compound is the pentadecylamidoethyl ethanolamide of hydroxyethoxyacetic acid.

3. The method of claim 1 wherein said compound is the undecenylamidoethyl ethanolamide of hydroxyethoxyacetic acid.

4. The method of claim 1 wherein said compound corresponds to the formula

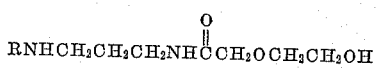

wherein R is a hydrocarbon radical derived from a coconut fatty amine moiety.

5. The method of claim 1 wherein said compound corresponds to the formula:

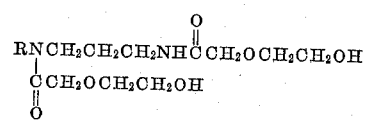

wherein R is a hydrocarbon radical derived from a soya fatty amine moiety.

No references cited.

LEON D. ROSDOL, *Primary Examiner.*

J. T. FEDIGAN, *Assistant Examiner.*